(12) United States Patent
Salter et al.

(10) Patent No.: US 12,680,843 B1
(45) Date of Patent: Jul. 14, 2026

(54) CONFIGURABLE REAR SENSOR BAR FOR VEHICLES

(71) Applicant: Ford Global Technologies, LLC, Dearborn, MI (US)

(72) Inventors: Stuart C. Salter, White Lake, MI (US); Connor Mccann, Berkley, MI (US); Kristen Johnson, Ann Arbor, MI (US); Shuang Mao, Troy, MI (US); Tamaira Tibisay Linares, Canton, MI (US); Annette Lynn Huebner, Highland, MI (US)

( * ) Notice: Subject to any disclaimer, the term of this patent is extended or adjusted under 35 U.S.C. 154(b) by 0 days.

(21) Appl. No.: 19/258,533

(22) Filed: Jul. 2, 2025

(51) Int. Cl.
B60R 9/06 (2006.01)
G01D 11/30 (2006.01)
G03B 17/56 (2021.01)

(52) U.S. Cl.
CPC .............. G01D 11/305 (2013.01); B60R 9/06 (2013.01); G03B 17/561 (2013.01)

(58) Field of Classification Search
CPC .. B60R 9/00; B60R 9/06; B60R 11/00; B60R 11/04; B60R 2011/0042; B60R 2011/008; B60R 2011/0084; G01D 11/24; G01D 11/245; G01D 11/26; G01D 11/30; G01D 11/305; G03B 17/00; G03B 17/56; G03B 17/561; G03B 19/00
USPC ................................................. 180/271, 274
See application file for complete search history.

(56) References Cited

U.S. PATENT DOCUMENTS

| | | | |
|---|---|---|---|
| 8,044,776 B2 | 10/2011 | Schofield et al. | |
| 2005/0105296 A1 | 5/2005 | French | |

| | | | |
|---|---|---|---|
| 2010/0117862 A1 | 5/2010 | Luft | |
| 2019/0064351 A1 | 2/2019 | Chen | |
| 2020/0244929 A1 | 7/2020 | Camilleri et al. | |

FOREIGN PATENT DOCUMENTS

| | | | | |
|---|---|---|---|---|
| CN | 116465460 A | * | 7/2023 | ............. F16M 11/18 |
| CN | 118928236 A | * | 11/2024 | ............. B60R 11/00 |
| WO | 2015003835 A1 | | 1/2015 | |

OTHER PUBLICATIONS

Yunhee Lee, et al., Rearview Camera-Based Blind-Spot Detection and Lane Change Assistance System for Autonomous Vehicles, https://www.mdpi.com/2076-3417/15/1/419, Jan. 4, 2025, pp. 1-20.

* cited by examiner

*Primary Examiner* — Jason D Shanske
*Assistant Examiner* — Daniel M. Keck
(74) *Attorney, Agent, or Firm* — Frank Lollo; Eversheds Sutherland (US) LLP

(57) ABSTRACT

A sensor bar that can be attached to a vehicle chassis is provided. The sensor bar includes a first main member, and two end caps attached to either end of the first main member. The two end caps are movable in a transverse direction with respect to the first main member. The two end caps can be moved as needed to vary the overall length of the sensor bar. This enables the sensor bar to be attached to various types of vehicle chassis that may have different widths. A plurality of sensors are disposed within this sensor bar and may be used to enable a variety of features of the vehicle like remote monitoring, autonomous driving, parking assistance, etc. Some of the sensors may move in sync with the end caps such that the sensor bar can be calibrated for any configuration and depending on the type of vehicle chassis.

13 Claims, 10 Drawing Sheets

200

408a

408a

CONFIGURABLE REAR SENSOR BAR FOR VEHICLES

FIELD

The present disclosure relates to the field of automobiles. Specifically, embodiments of the present disclosure relate to a configurable sensor bar that can be attached to a vehicle chassis.

BACKGROUND

Vehicle chassis may have different widths based on the type of the vehicle. Typically, a chassis cab is a partially manufactured vehicle that does not include a completed back end. A vehicle builder may use such a chassis cab to install different types of back ends on the vehicle. When the vehicle builder wants to install a rear sensor bar on these chassis cabs, there is no universal solution, and each sensor bar is usually custom built for the particular chassis cab. This results in increased price and complexity.

Accordingly, there is a need in the industry for an improved rear sensor bar.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
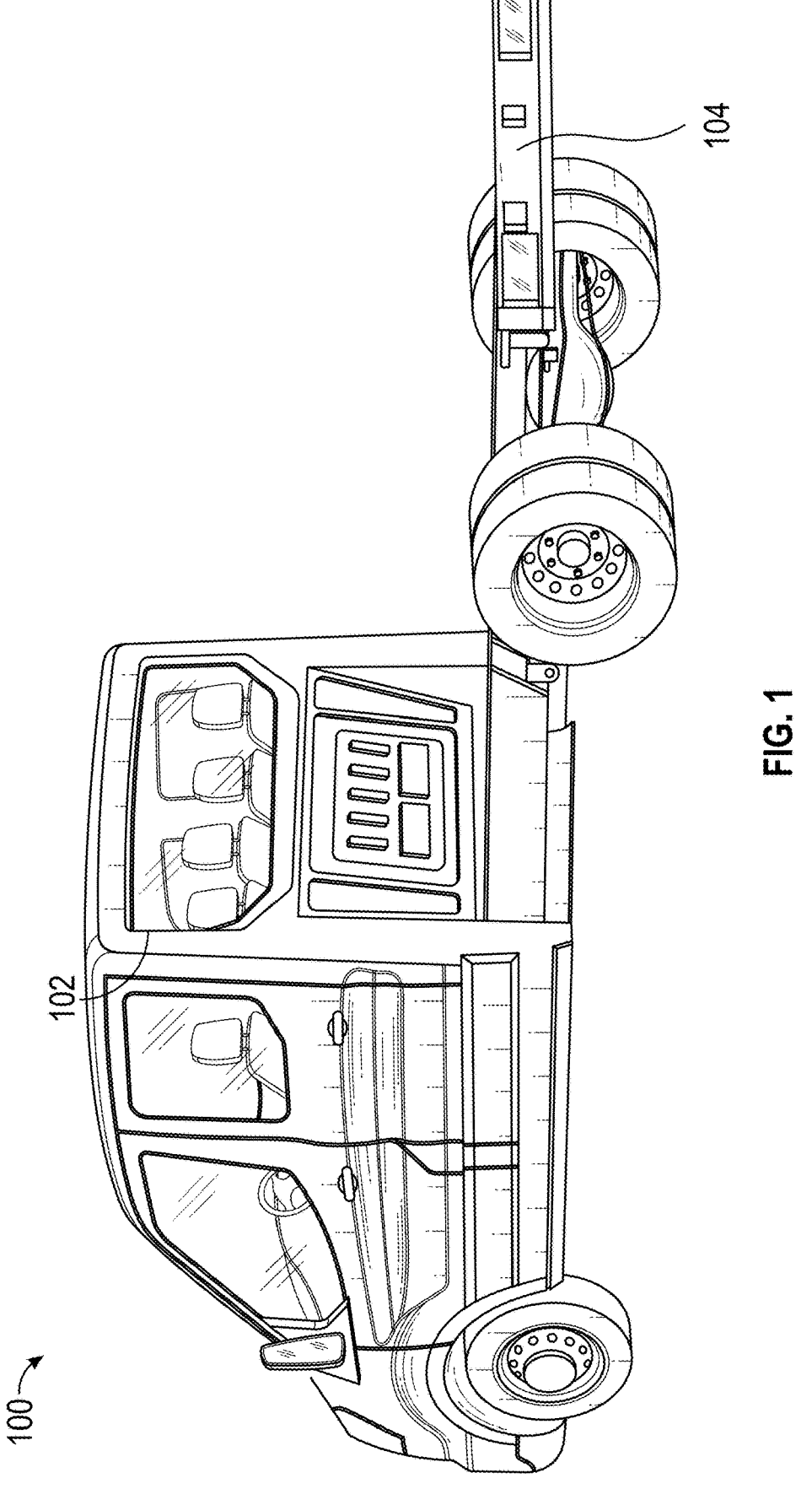
FIG. 1 illustrates a type of a vehicle in which embodiments of the present disclosure can be implemented.

The present disclosure describes systems and methods for a universal sensor bar that can be attached to different types of vehicle chassis. Specifically, embodiments of the present disclosure relate to a configurable sensor bar whose length can be adjusted to fit different width of vehicle chassis by adjusting the position of two end caps attached to the sensor bar.

Embodiments of the present disclosure provide a sensor bar that may include a first member having a first side and an opposing second side, a first end cap slidably coupled to the first side, a second end cap slidably coupled to the second side, a plurality of sensors disposed underneath each of the first end cap and the second end cap, and one or more connection points usable to attach the sensor bar to a vehicle chassis.

In another instance, a sensor bar is provided that may include a first rigid member, a first end cap movably connected to a first end of the first rigid member, a second end cap movably connected to a second send of the first rigid member, one or more sensors coupled to first end cap and the second end cap, at least one sensor attached to an external surface of the first rigid member; and one or more connection points disposed on the first rigid member and usable to connect the sensor bar to a vehicle chassis.

In yet another embodiment of the present disclosure a sensor bar is provided that may include a first member defining an internal chamber, a first end cap slidably coupled to a first end of the first member, a second end cap slidably coupled to a second end of the first member, a sensor holding mechanism at least partially disposed in the internal chamber, and one or more sensors attached to the sensor holding mechanism, wherein at least a portion of the sensor holding mechanism is movable in a transverse direction with respect to the first member.

These and other advantages of the present disclosure are provided in detail herein.

Illustrative Embodiments

The disclosure will be described more fully hereinafter with reference to the accompanying drawings, in which example embodiments of the disclosure are shown and not intended to be limiting.

A chassis cab typically consists of the front of a vehicle which may include an engine, a cab, a frame, and a drivetrain. A chassis cab usually lacks a rear body. This configuration of the chassis cab allows upfitters or vehicle builders to create customized solutions like utility trucks, box vans, ambulances, tow trucks, flatbeds, etc. A vehicle builder may first select the appropriate chassis cab based on the intended application, considering factors like gross vehicle weight rating (GVWR), wheelbase length, engine type, and drivetrain configuration. Next, the vehicle builder may fabricate and install a cargo box, utility bed, service body, or other specialty equipment. These components are typically bolted or welded to the frame and are aligned precisely with the chassis specifications. Proper weight distribution and structural integrity are beneficial for optimal vehicle performance.

One of the issues faced when working with a chassis cab is the lack of a universal and/or configurable solution for providing rear Advanced Driver Assistance Systems (ADAS) functionality to these chassis cabs. Chassis cabs come without a rear body, so there is often no standardized or pre-designed mounting point for sensors like rear radar modules, rear ultrasonic sensors, rear backup cameras (i.e., image sensors), LIDAR sensors, rear surround view systems, etc. Thus, any ADAS hardware must be custom mounted onto whatever upfit (utility bed, box truck, flatbed, etc.) is added, which often varies in shape, material, and height. ADAS sensors (especially radar and cameras) require precise alignment in both horizontal and vertical axes for accurate operation. Variations in body installation and mounting height of chassis cabs can cause misalignment, leading to false readings or system malfunctions. Calibration procedures must be adapted to nonstandard setups, which may require specialized equipment or manufacturer assistance. Further, body types like service beds, box bodies, or equipment racks may obstruct sensor views or reflect signals, causing blind spots, radar interference, and/or camera distortion. Vehicle builders have to carefully position these ADAS sensors to maintain a clear field of view and avert obstructions like steps, ladders, or tailgates. Embodiments of the present disclosure overcome the above issues by providing a configurable rear sensor bar that can accommodate different types of vehicle chassis with varying widths. The configurable sensor bar can then be easily calibrated using standard calibration techniques.

FIG. 1 illustrates a vehicle 100 that may need addition of a rear sensor bar. The vehicle 100 is a one type of a chassis cab that may benefit from the embodiments of the present disclosure. The vehicle 100 includes a front portion 102 that may include the driver cabin, an engine and associated components, front wheels and front axle, etc. The vehicle 100 may include a back portion 104 that includes a portion of a chassis, rear axle and wheels, and associated components. The back portion 104 is unfinished and a vehicle builder may add one or more structural components to the back portion 104 to convert the vehicle 100 into a box truck, utility truck, or the like. Conventionally, if the vehicle builder wants to add a rear sensor bar to the vehicle 100, that sensor bar may need to custom designed based on the width of the chassis of the vehicle 100 and available connection points on the chassis. Embodiments of the present disclosure overcomes all of the above issues by providing a configurable rear sensor bar that can be mounted to chassis cabs having differing chassis dimensions.

The vehicle 100 may include a plurality of units including, but not limited to, an automotive computer, a Vehicle Control Unit (VCU), and a detection unit. Details of the vehicle 100 are provided below in reference to FIG. 6.

FIGS. 2A-2E illustrate various views of a sensor bar 200 according to an embodiment of the present disclosure. In an embodiment, the sensor bar 200 may include multiple sensors such as cameras (e.g., image sensors), proximity sensors, ultrasonic sensors, radar sensors (e.g., LIDAR sensors), thermal sensors, infrared sensors, and the like. All these sensors may be integrated with the vehicle sensory system described below with reference to FIG. 6. The sensor bar 200 may include a first member 202 that may also be referred to as the "main member." The first member 202 can be made of any rigid material approved for use in vehicles. The first member 202 may have two end caps 204a and 204b slidably attached to it. Each of the end cap 204a and 204b can be moved in a transverse direction from a first position to a second position as illustrated by the arrows in FIG. 2A. The end caps 204a and 204b can be placed in several different positions between the first position and the second position. In this manner, the end caps 204a and 204b can be placed in the desired position based on the width of the vehicle chassis. When the end caps 204a and 204b are moved in the transverse direction, it effectively modifies the length of the sensor bar 200. Thus, the length of the sensor bar 200 can be adjusted as needed, based on the width of vehicle chassis in order to fit the width of the vehicle chassis. The first member 202 may have a sensor cap 206 attached to it. In an embodiment, the sensor cap 206 may house a rear facing camera. The sensor bar 200 may further include a pair of end covers 208 that are placed over one or more sensors. In an embodiment, one or more radar sensors may be located at the edges of the sensor bar 200 and covered by the pair of end covers 208.

Figure 2A:
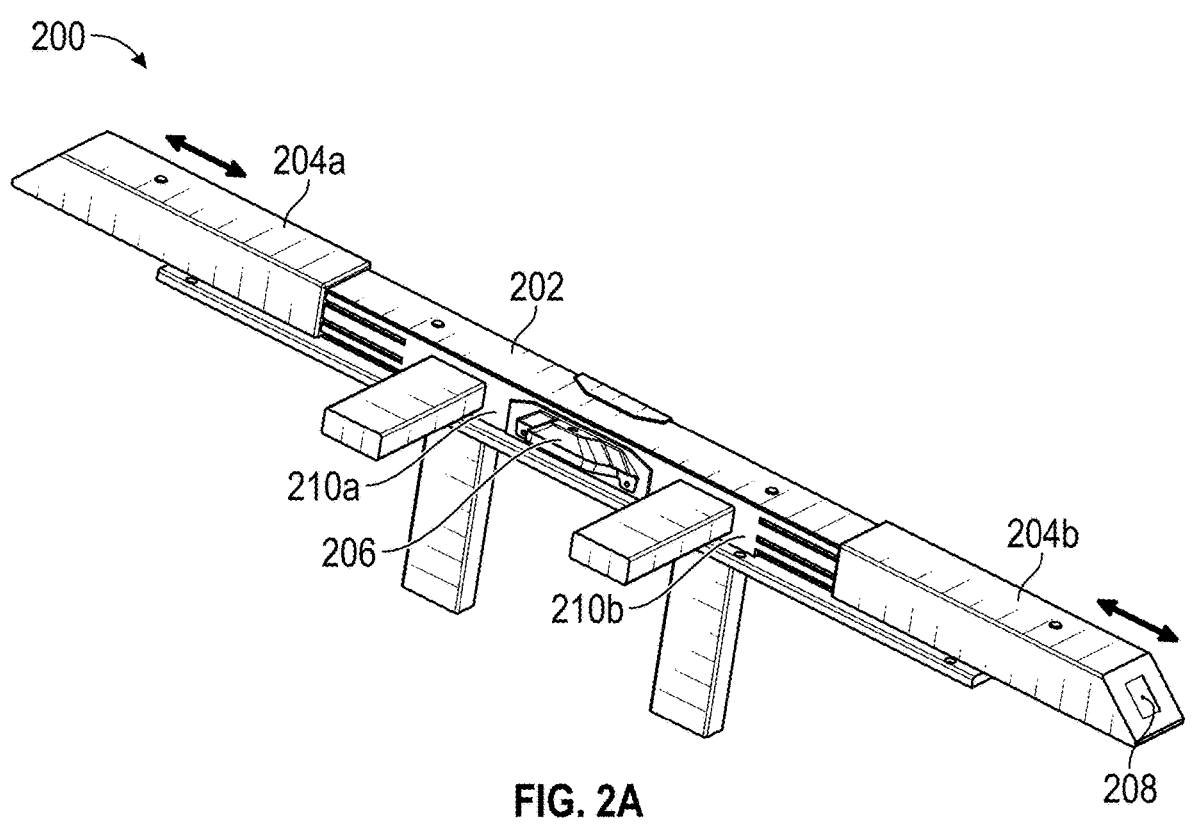
FIGS. 2A-2E illustrate various views of a sensor bar according to an embodiment of the present disclosure.
Figure 2B:
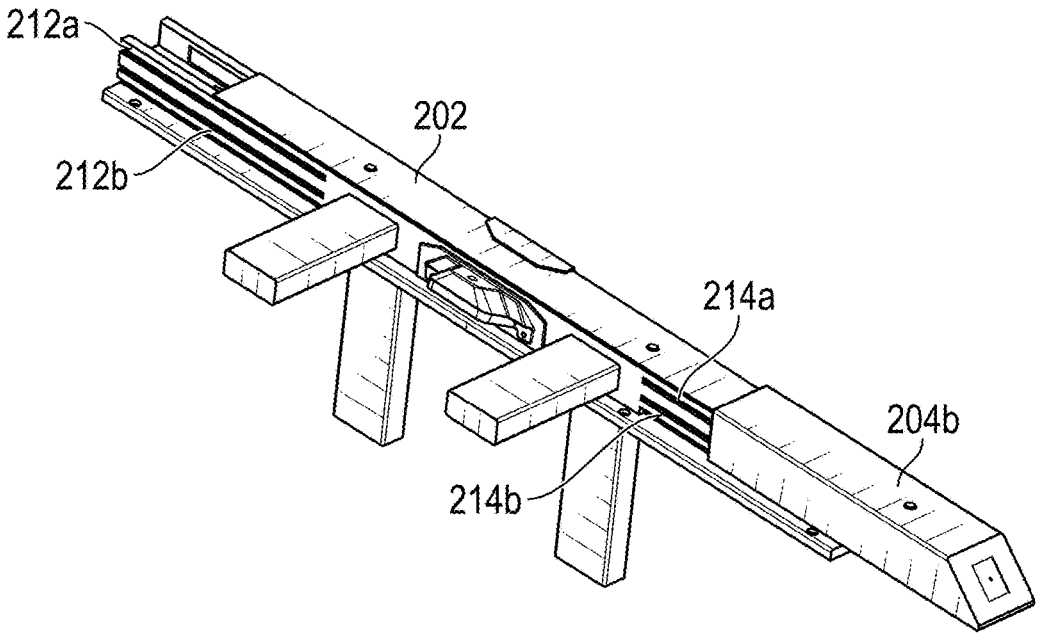

The sensor bar 200 may further include a pair of connection points 210a and 210b. The connection points 210a and 210b may be used to connect the sensor bar 200 to the vehicle chassis. The connection means that may be used to connect the sensor bar 200 to the vehicle chassis may include one or more fasteners, additional structural members as illustrated in FIG. 2A, and/or other suitable means known in the art. The first member 202 may include multiple channels that may be used to couple the end caps 204a and 204b to the first member 202. The first member may include a pair of first channels 212a and 212b that may be used to couple the end cap 204a to the first member 202. The end cap 204a may include complimentary features that may engage with the channels 212a and 212b in order to allow the end cap 204a to slide horizontally over the first member 202. As illustrated in FIG. 2B, the pair of first channels 212a and 212b are located on a first surface of the first member 202. Another pair of first channels 212a and 212b are located on an opposite second surface of the first member 202 (not shown). Thus, the end cap 204a may engage with each of the pair of first channels 212a and 212b on disposed on first surface and the second surface of the first member 202. Similarly, the first member 202 also includes a pair of second channels 214a and 214b disposed on the first surface of the first member 202 and another pair of second channels disposed on the opposing second surface of the first member 202. These two pairs of second channels 214a and 214b may engage with corresponding features of the end cap 204b enabling the end cap 204b to slide horizontally over the first member 202. In an embodiment, the channel 212a is parallel to the channel 212b and the channel 214a is parallel to the channel 214b. In another embodiment, the channel 212a is disposed in-line with the channel 214a and the channel 212b is disposed in-line with the channel 214b. In an embodiment, each of the channels 212a, 212b, 214a, and 214b are of the same length. In other embodiments, the length of the channels 212a, 212b, 214a, and 214b may have different lengths.

Figures 2C, 2D:
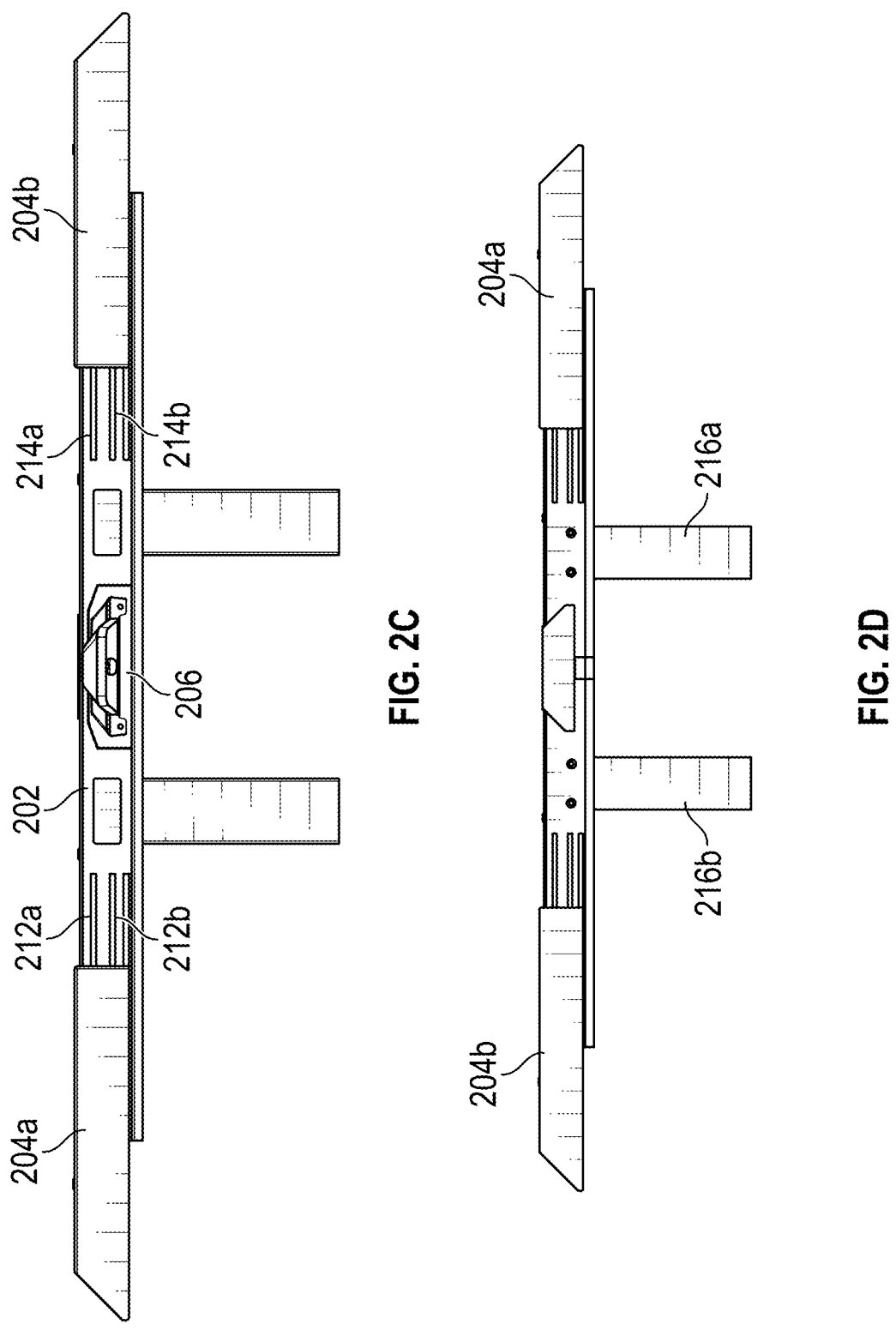
Figure 2E:
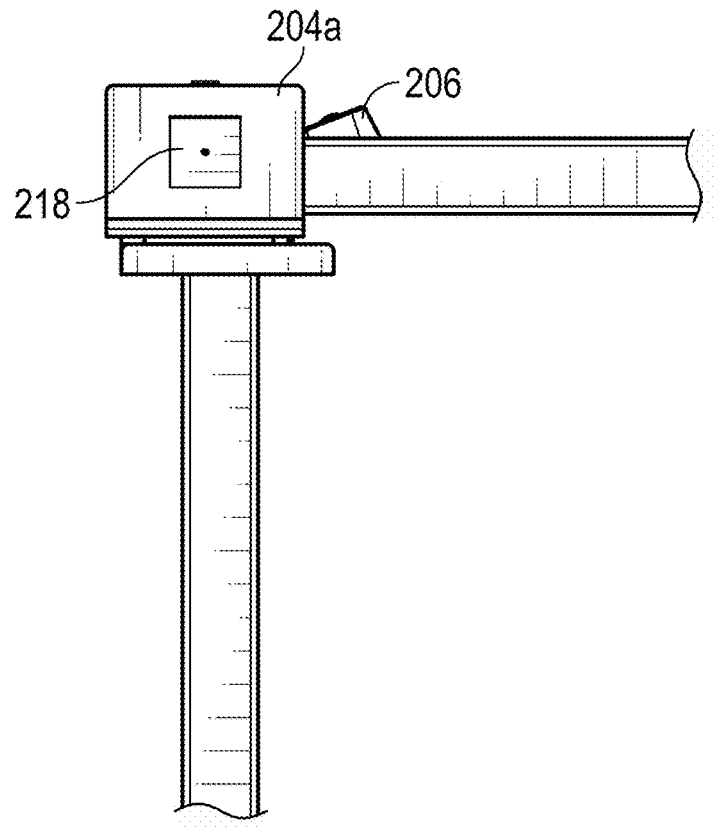

FIG. 2C illustrates a front view of the sensor bar 200 according to an embodiment of the present disclosure. In FIG. 2C, the end caps 204a and 204b are shown in a partially extended position. In an embodiment, the first member 202 may define an internal chamber in which one or more sensors may be placed or mounted along the length of the first member 202. In an embodiment, each of the end caps 204a and 204b can be independently movable to adjust the length of the sensor bar. In other embodiments, the end caps 204a and 204b may move synchronously with each other to main the left/right symmetry of the sensor bar 200. In an embodiment, one or more connections means 216a and 216b may be used to connect the sensor bar 200 to the vehicle chassis. The connection means 216a and 216b may include planar structurally rigid members that may also enhance the structural rigidity of the sensor bar 200. In an embodiment, one or more sensors may be mounted to an internal surface of each of the end caps 204a and 204b. As the end caps 204a and 204b are moved laterally, the sensors mounted to the end caps 204 and 204b may also move to accommodate the various positions of the end caps 204a and 204b. A sensor 218 may be coupled to an end outer surface of each of the end caps 204a and 204b. In some embodiments, sensor 218 may be a radar sensor.

Figure 2F:
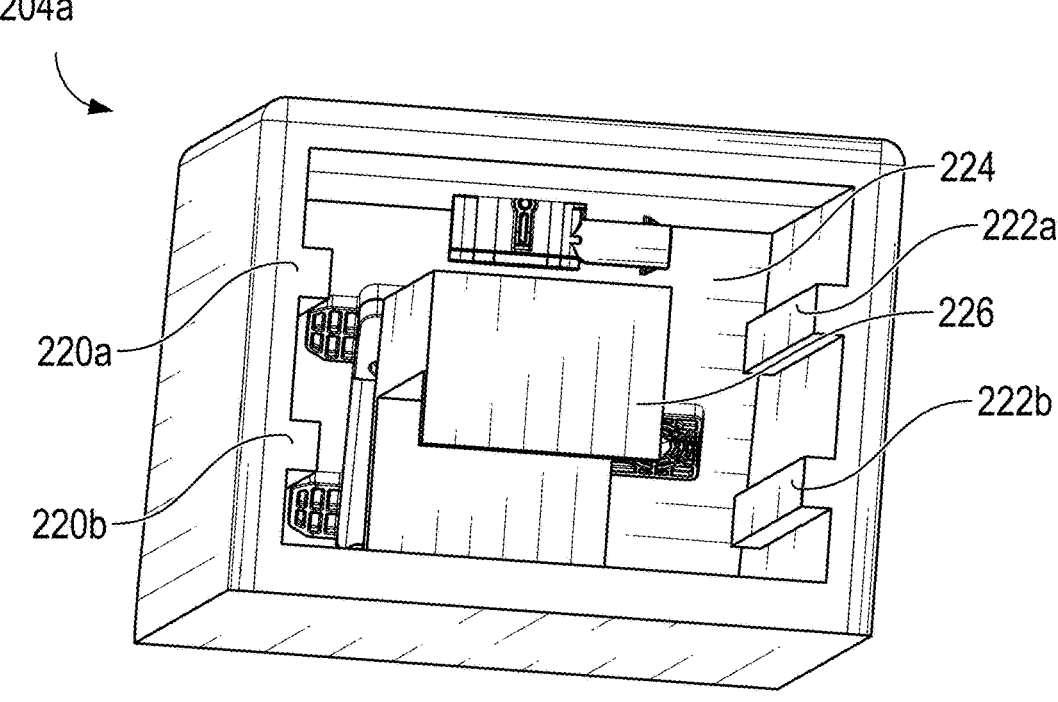
FIG. 2F illustrates an end cap of a sensor bar according to an embodiment of the present disclosure.

FIG. 2F illustrates a sectional view of one of the end caps 204a. The other end cap 204b has a substantially similar construction. The end cap 204a defines a chamber 224. In an embodiment, the chamber 224 may be rectangular in shape having four walls that define the chamber 224. The end cap 204a may further include a first pair of channels 220a and 220b disposed on a first wall of the end cap 204a. The end cap 204 may further include a second pair of channels 222a and 222b disposed on a second wall of the end cap 204a. In an embodiment, the first wall is parallel to the second wall. The channel 220a is parallel to the channel 220b and the channel 222a is parallel to the channel 222b. The end cap 204a may include a retention mechanism 226 located within the chamber 224. The retention mechanism may be used to hold the end cap 204a in place once the end cap 204a is extended out to the desired length. Once end cap 204a (and 204b) are placed in the optimal positions based on the width of the vehicle chassis, the retention mechanism 206 may be operated to lock the end cap 204a in place and to the first member 202. Thereafter, the retention mechanism may not be movable unless by an authorized repair personnel. In an embodiment, the retention mechanism 226 may be operable using a special tool customized to the sensor bar 200.

FIGS. 3A-3D illustrate a sensor bar 300 according to another embodiment of the present disclosure. The sensor bar 300 may include a first member 302 and two end caps slidably coupled to the first member 302. A first end cap 308a may be coupled to a first end of the first member 302 and a second end cap 308b may be coupled to a second end of the first member 302. The first end of the first member 302 may be opposite to the second end of the first member 302. The first member 302 may further include a sensor housing 304 attached to the first member 302. In an embodiment, the sensor housing 304 may include a camera (such as a rear-facing camera). Ther first member 302 may include a pair of connection points 306a and 306b. The connection points 306a and 306b may be used to fixedly connect the sensor bar 300 to a vehicle chassis. The first end cap 308a may further include a sensor cover 310a attached to an end of the first end cap 308a. The second end cap 308b may also include a sensor cover 310b attached to an end of the second end cap 308b. The first member 302 may define an internal chamber. One or more sensors may be housed within the internal chamber of the first member 302. Further, each of end caps 308a and 308b may also define an internal recessed region. One or more sensors may be disposed within the internal recessed region of each of the end caps 308a and 308b.

The first member 302 may include a pair of first channels 312a and 312b that are disposed on a first surface of the first member 302. The first member 302 may also include a pair of second channels 314a and 314b disposed on the first surface. The pair of first channels 312a and 312b are disposed at one end of the first member 302 and the pair of second channels 314a and 314b are disposed at a distal end of the first member 302. In an embodiment, the channel 312a is parallel to the channel 312b and the channel 314a is parallel to the channel 314b. Further, the channels 312a and 314a are disposed in-line with each other and the channels 312b and 314b are disposed in-line with each other. The first member 302 may include a pair of third channels (not shown) and a pair of fourth channels (not shown) disposed on a second surface of the first member 302. In an embodiment, the first surface of the first member 302 is opposite to the second surface of the first member 302. In an embodiment, the pair of third channels is identical to the pair of the first channels 312a and 312b and the pair of the fourth channels is identical to the pair of the second channels 314a and 314b. In an embodiment, a length of each of the channels of the pair of first channels, the pair of second channels, the pair of third channels, and the pair of fourth channels is the same.

Figure 3A:
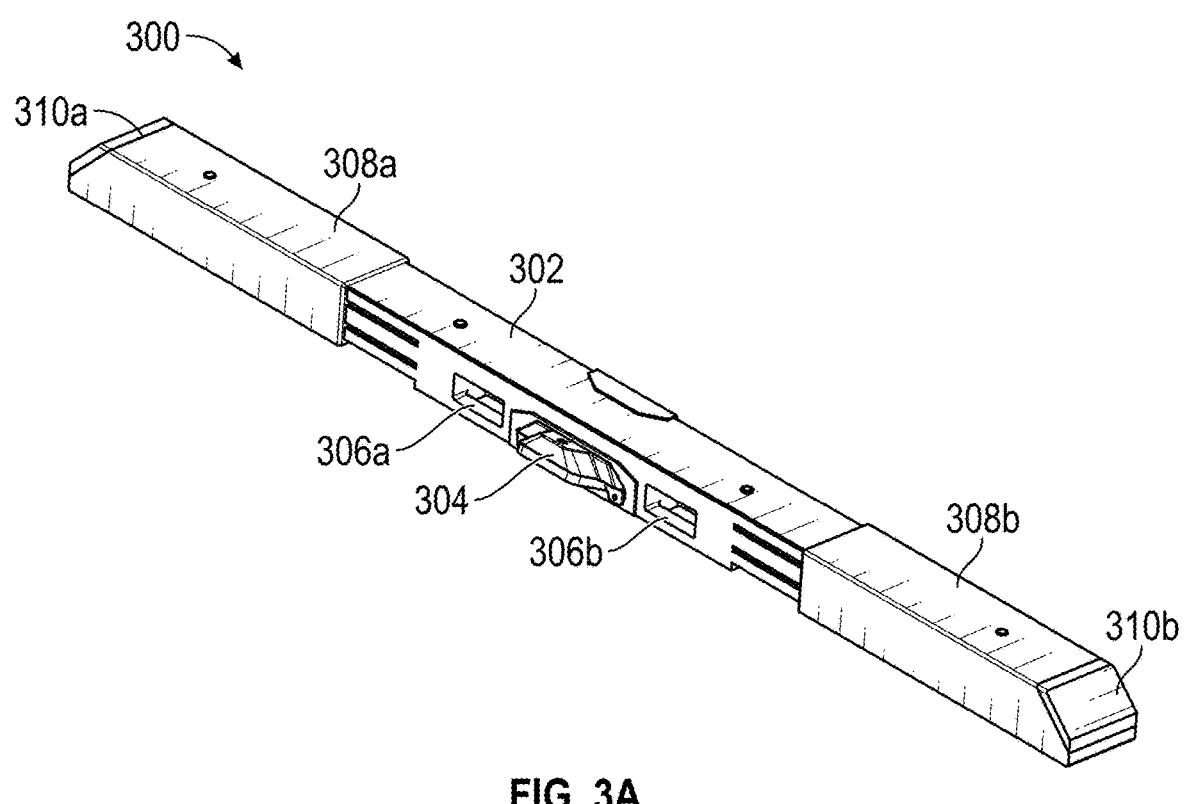
FIGS. 3A-3D illustrate various views of a sensor bar according to another embodiment of the present disclosure.
Figure 3B:
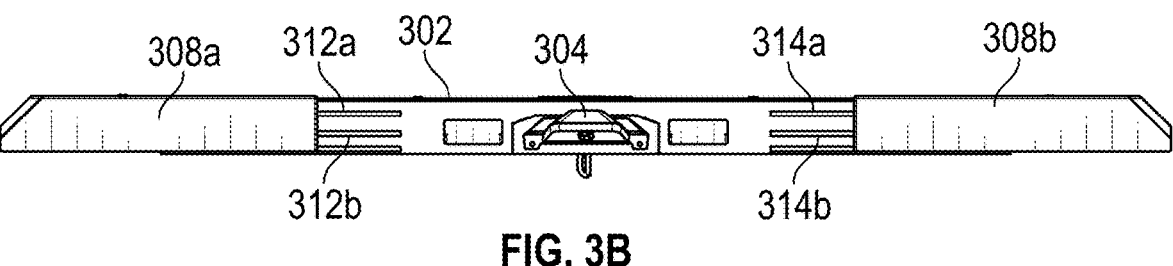
Figure 3C:
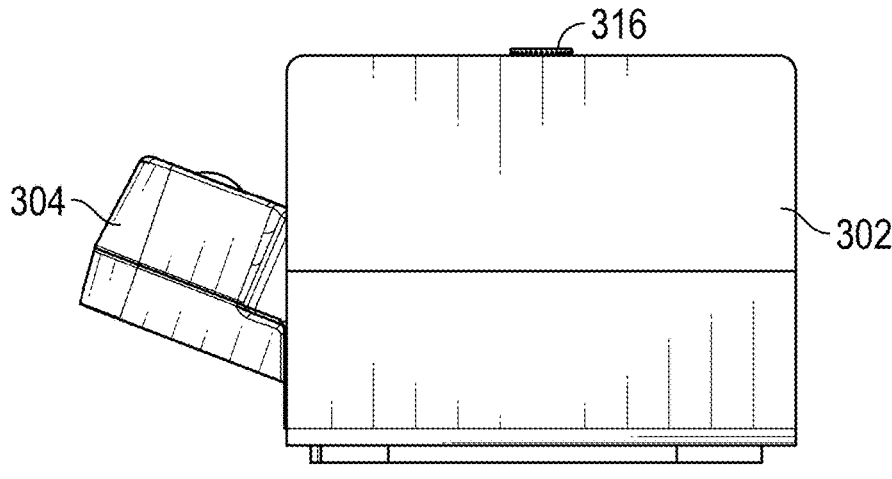
Figure 3D:
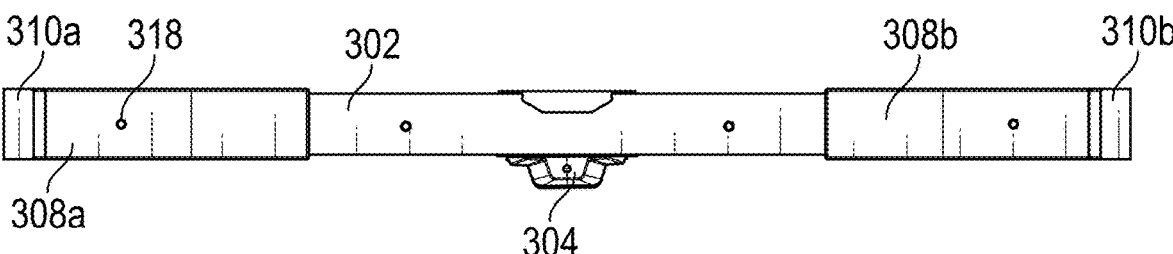

In an embodiment, the first end cap 308a is configured to be coupled with the pair of first channels 312a and 312b and the pair of third channels. Similarly, the second end cap 308b is configured to be coupled with the pair of second channels 314a and 314b and the pair of fourth channels. The first end cap 308a and the second end cap 308b include complimentary features that can physically engage with the pair of first channels, the pair of second channels, the pair of third channels, and the pair of fourth channels to allow the first end cap 308a and the second end cap 308b to slide over the first member 302. FIG. 3C illustrates a side view of the sensor bar 300 according to an embodiment of the present disclosure. The first member 302 or the may include a sensor portion 316 that protrudes above the first member 302. FIG. 3D illustrates a top view of the sensor bar 300 according to an embodiment of the present disclosure. Portion of one or more sensors 318 may be visible from the top of the sensor bar 300. These sensors may be used for several functions or features associated with the vehicle to which the sensor bar 300 is attached.

FIGS. 4A-4D illustrate several views of a sensor bar 400 according to an embodiment of the present disclosure. The sensor bar 400 may include a first member 402, a first end cap 408a and a second end cap 408b. The first end cap 408a is coupled to a first end of the first member 402 and the second end cap 408b is coupled to a second opposing end of the first member 402. The first member 402 may further include a camera housing 404 that my include a rear-facing camera. The first member 402 may further include a first connection point 406a and a second connection point 406b located on either side of the camera housing 404. The first connection point 406a and the second connection point 406b may be used to secure the sensor bar 400 to the vehicle chassis. Each of the end cap 408a and 408b may have an identical construction. For instance, the first end cap 408a may have a curved upper surface. The upper surface of the first end cap 408a may include first window 410a and a second window 412a. The first window 410a and the second window 410b provide a means for exposing the underlying sensors to the external environment. In an embodiment, the first window 410a is bigger in size than the second window 412a. In an embodiment, the first window 410a may have an elongated shape to accommodate lateral or transverse movement of the first end cap 408a while still ensuring that the sensors located underneath the first window 410a are still functional. The second end cap 408b may include third window 410b and a fourth window 412b. The third window 410b may be identical to the first window 410a and the fourth window 412b may be identical to the second window 412a.

Figures 4A, 4B:
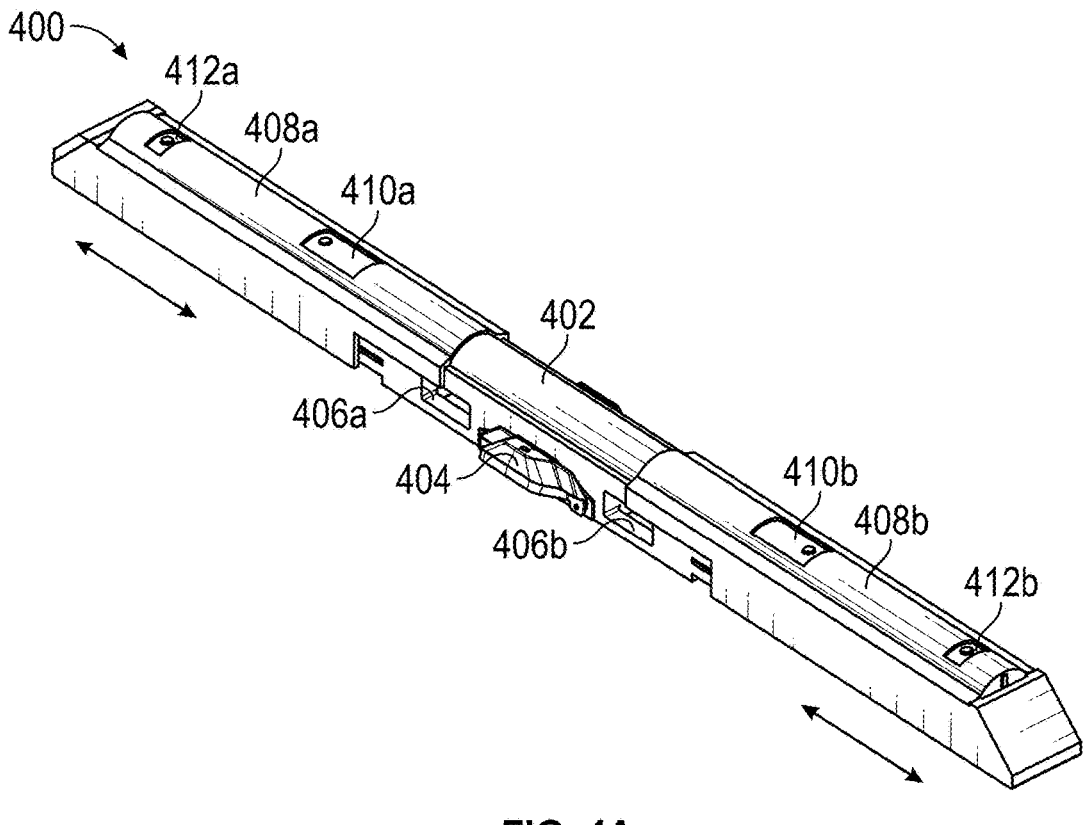
FIGS. 4A-4D illustrate various views of a sensor bar according to yet another embodiment of the present disclosure.

Each of the first end cap 408a and the second end cap 408b may be configured to move laterally as indicated by the arrows in FIG. 4A. In other words, the first end cap 408a is slidably coupled to the first member 402 and the second end cap 408b is slidably coupled to the first member 402. In order to enable the first end cap 408a and the second end cap 408b to slide over the first member 402, the first member 402 includes four pairs of channels. A first pair of channels 414a and 414b is located on a first surface of the first member 402. A second pair of channels 416a and 416b is located on the first surface of the first member 402. A third pair of channels (not shown) is located on a second surface of the first member 402. The second surface is opposite the first surface. A fourth pair of channels (not shown) is also located on the second surface of the first member 402. In an embodiment, the two channels 414a and 414b are parallel to each other and the two channels 416a and 416b are parallel to each other. Further, the channel 414a is disposed in-line with the channel 416a and the channel 414b is disposed in-line with the channel 416*b*. The third pair of channels and the fourth pair of channels may have a similar configuration.

Figures 4C, 4D:
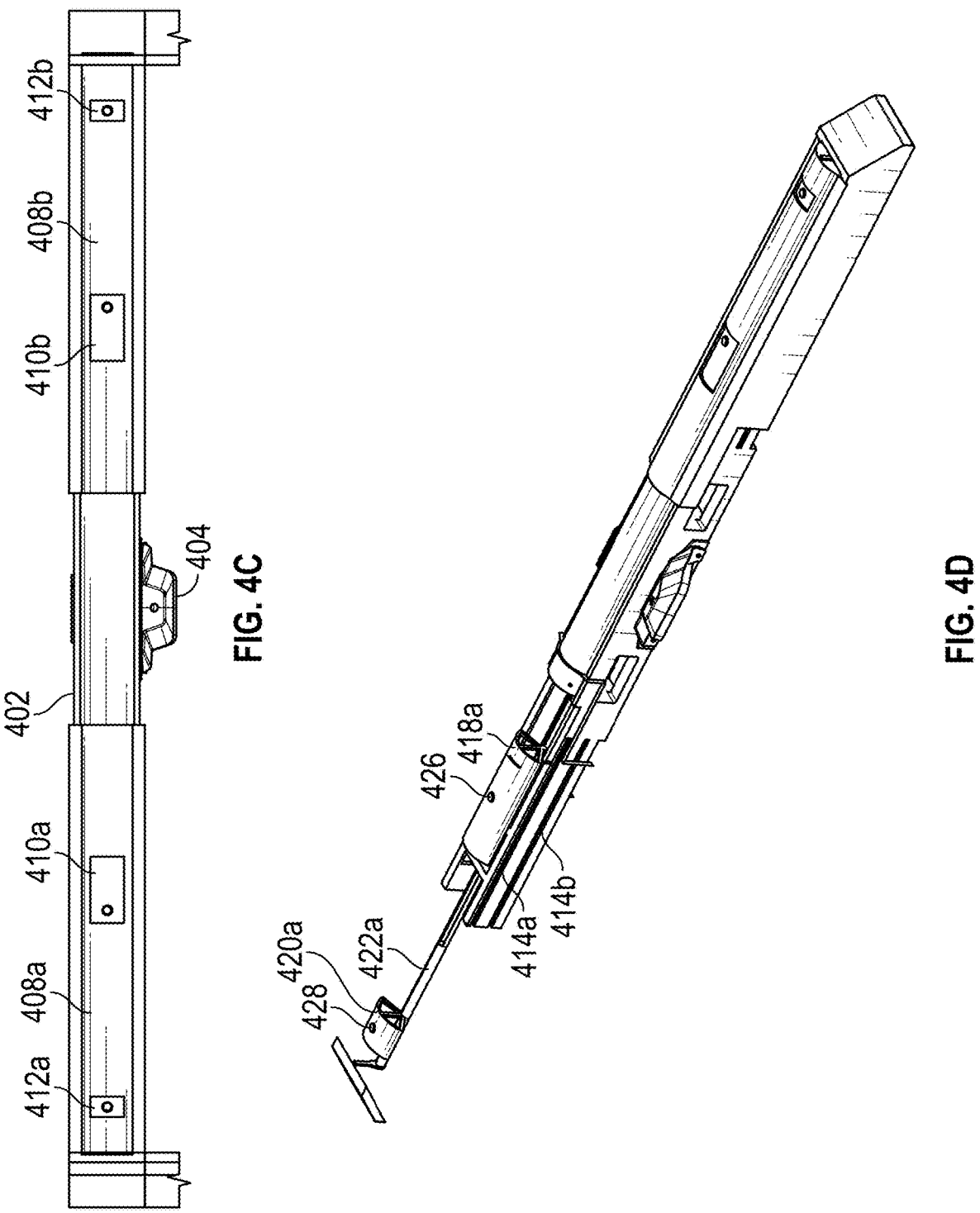

The first member 402 may define an internal chamber that may house the sensor assembly as illustrated in FIG. 4D. In an embodiment, the sensor assembly may include a first sensor holding member 422*a*. The sensor holding member 422*a* may have first cover 418*a* attached to the sensor holding member 422*a*. A sensor 426 may be attached to the first cover 418*a* on an underside of the first cover 418*a*. The sensor holding member 422*a* may also have a second cover 420*a* attached to it. A different sensor 428 may be attached to the sensor holding member 422*a*. In an embodiment, the first cover 418*a* is attached to a portion of the sensor holding member 422*a*. This portion of the sensor holding member 422*a* may be stationary and not movable with respect to the first end cap 408*a*. The second window 420*a* may be connected to a second portion of the sensor holding member 422*a*. This portion of the sensor holding member 422*a* may move in sync with the first end cap 408*a*. Thus, while the sensor 426 may travel within the window 410*a*, the sensor 428 may move along with the first end cap 408*a* such that the sensor 428 stays in a fixed position in relation to the window 412*a*.

The first end cap 408*a* and the second end cap 408*b* can be independently moved in a transverse or horizontal direction. Thus, the effective length of the sensor bar 400 can be adjusted by manipulating the positions of the end caps 408*a* and 408*b*. When the sensor bar 400 is to be attached to a vehicle chassis (e.g., vehicle 100), the vehicle builder may measure the width of the vehicle chassis and determine the locations of the various connection points of the vehicle chassis. Thereafter, the vehicle builder may move one or both of the end caps 408*a* and/or 408*b* to place the sensor bar 400 in the desired length. Thereafter, the sensor bar 400 may be attached to the vehicle chassis. Once attached, the sensor bar 400 may be electrically connected to the vehicle sensor system. The sensor bar 400 may then communicate with the various electrical system of the vehicle 100 and the vehicle can be used to control the various features and functions of the sensor bar 400.

Figure 5A:
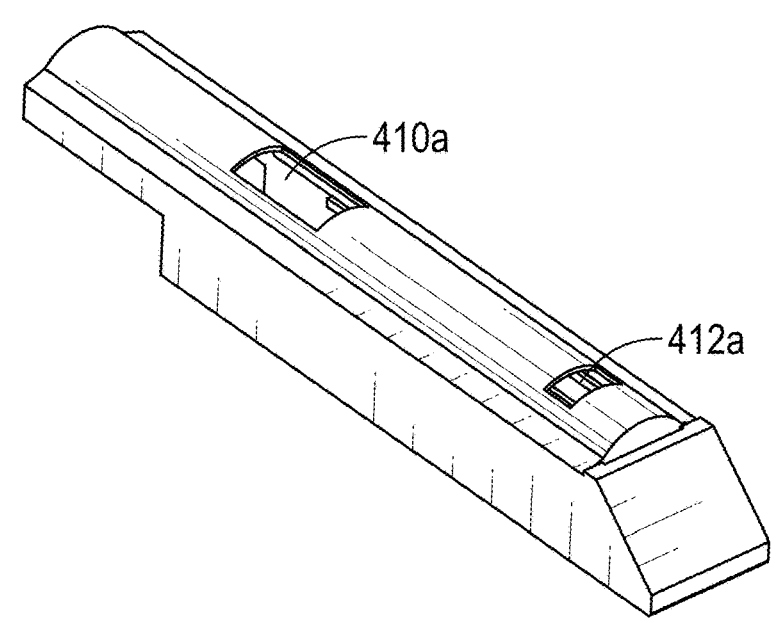
FIGS. 5A and 5B illustrate details of an end cap for a sensor bar according to an embodiment of the present disclosure.
Figure 5B:
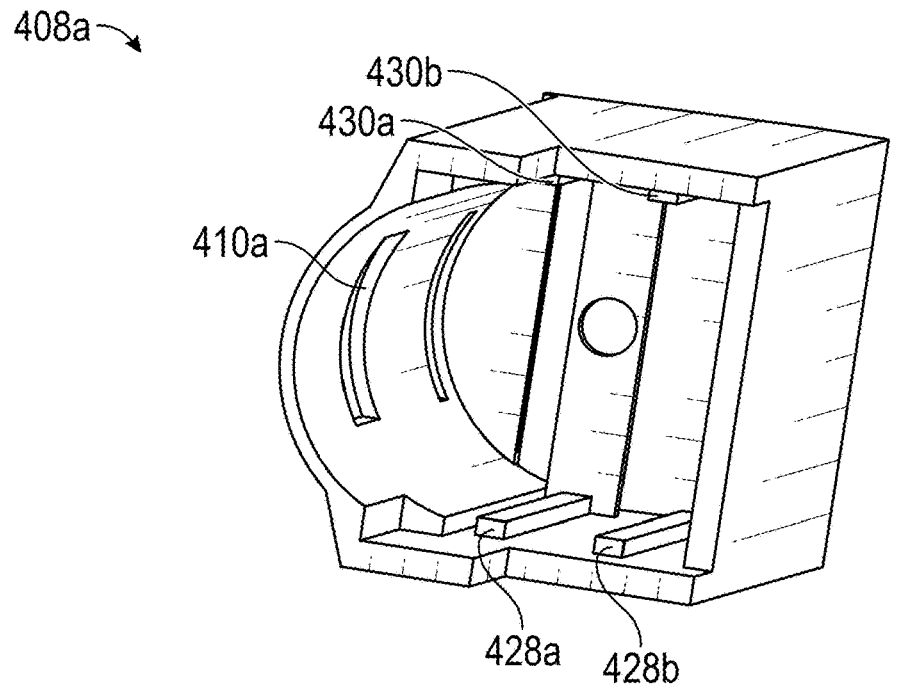

FIGS. 5A and 5B illustrate various views of the end cap 408*a* according to an embodiment of the present disclosure. The second end cap 408*b* may have an identical structure to the first end cap 408*a*. The first end cap 408*a* may define an internal chamber. Two pairs of rails may be located within the internal chamber. A first pair of rails 428*a* and 428*b* may be located on an anterior surface of a first wall of the first end cap 408*a*. A second pair of rails 430*a* and 430*b* may be located on a second anterior surface of a second wall of the first end cap 408*a*. In an embodiment, the first wall may be disposed opposite the second wall. The first pair of rails 428*a* and 428*b* may engage with the pair of first channels 414*a* and 414*b* respectively. The second pair of rails 430*a* and 430*b* may engage with the pair of third channels of the first end cap 408*a*. This allows the first end cap 408*a* to slide over a portion of the first member 402. In this manner, the sensor bar 400 can be adjusted to be attached to a variety of vehicle chassis that may have different widths. Thus, a single sensor bar 400 (and sensor bars 200 and 300) can be used for a variety of vehicle chassis having different widths and construction.

Figure 6:
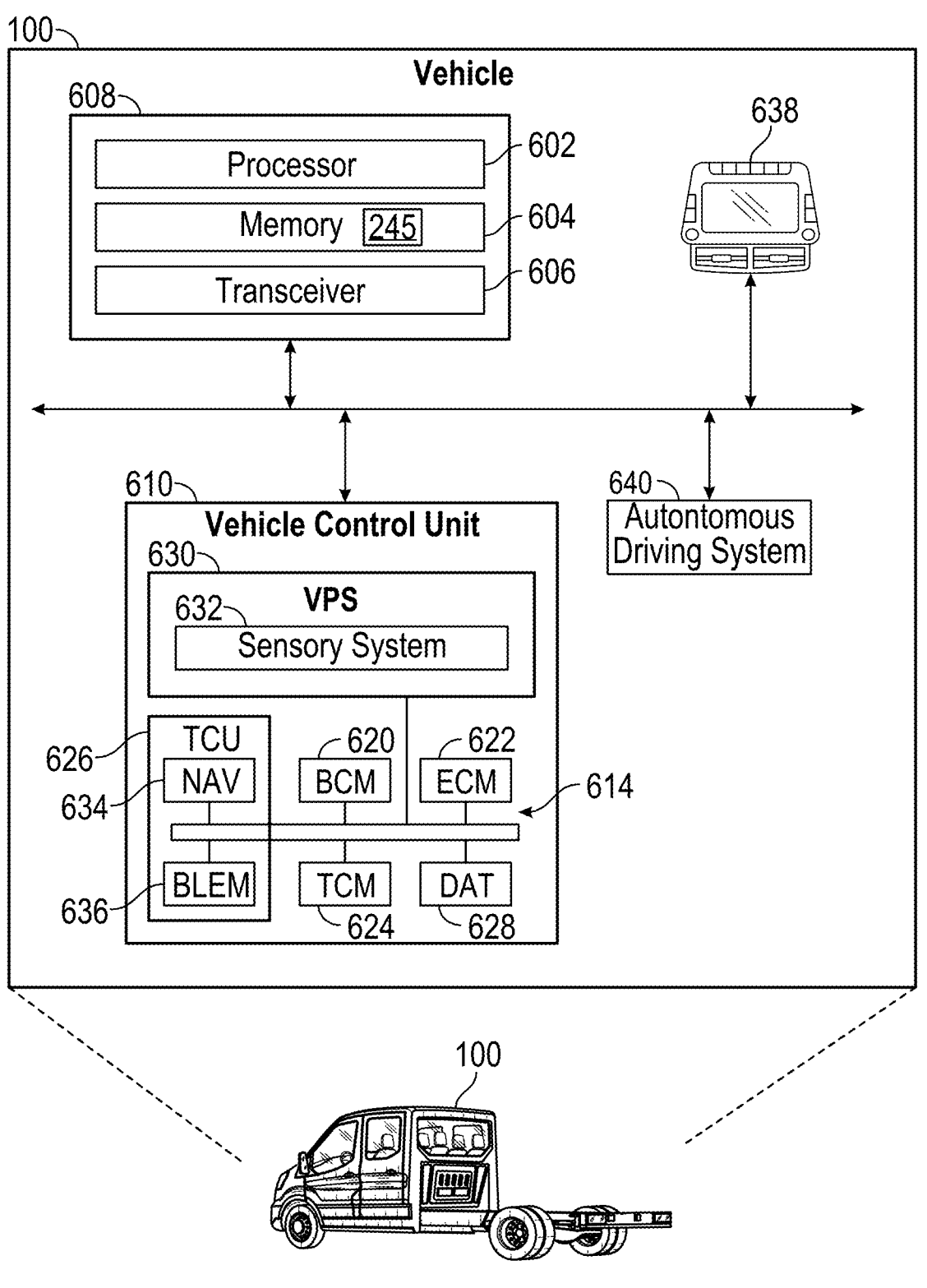
FIG. 6 illustrates a block diagram of the vehicle in which embodiments of the present disclosure can be implemented.

FIG. 6 illustrates a block diagram of the vehicle 100 in which embodiments of the present disclosure can be implemented. The vehicle 100 may include a plurality of units including, but not limited to, an automotive computer 608, a Vehicle Control Unit (VCU) 610, and an infotainment unit 638. The VCU 610 may include a plurality of Electronic Control Units (ECUs) 614 that are in communication with the automotive computer 608.

In some embodiments, a user device, such as a mobile phone, a laptop computer, a smart fob, or the like, may be configured to connect with the automotive computer 608, which may communicate via one or more wireless connection(s), and/or may connect with the vehicle 100 directly by using near field communication (NFC) protocols, Bluetooth® protocols, Wi-Fi, Ultra-Wideband (UWB), and other possible data connection and sharing techniques.

The automotive computer 608 may be installed anywhere in the vehicle 100, in accordance with the disclosure. The automotive computer 608 may be or include an electronic vehicle controller, having one or more processor(s) 602, one or more memory devices 604, and one or more transceivers 606.

The processor(s) 602 may be disposed in communication with one or more memory devices that are in communication with the respective computing systems (e.g., the memory 604 and/or one or more external databases not shown in FIG. 6). The processor(s) 602 may utilize the memory 604 to store programs in code and/or to store data for performing operations in accordance with the disclosure. The memory 604 may be a non-transitory, computer-readable storage medium or memory storing a vehicle control program code. The memory 604 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.). In some embodiments, memory 604 may include a module 645 that can implement the various embodiments of the present disclosure. Module 645 may include instructions that can be executed by the processor 602 to realize the various embodiments of the present disclosure.

Automotive computer 608 may also include a transceiver 606. The transceiver 606 may be configured to receive information/inputs from one or more external devices or systems, e.g., a user device 608, an external server, and/or the like. Further, the transceiver 606 may transmit notifications, requests, signals, etc., to the external devices or systems. In addition, the transceiver 606 may be configured to receive information/inputs from vehicle components such as the vehicle sensory system 632, one or more ECUs 614, and/or the like. Further, the transceiver 606 may transmit signals (e.g., command signals) or notifications to the vehicle components such as the Body Control Module (BCM) 620, the infotainment system 638, and/or the like.

In some embodiments, the VCU 610 may share a power and/or communications bus with the automotive computer 608 and may be configured and/or programmed to coordinate the data between vehicle systems, connected servers, and/or the like. The VCU 610 may include or communicate with any combination of the ECUs 614, such as, for example, the BCM 620, an Engine Control Module (ECM) 622, a Transmission Control Module (TCM) 624, a Telematics Control Unit (TCU) 626, a Driver Assistance Technologies (DAT) controller 628, etc. The VCU 610 may further include and/or communicate with a Vehicle Perception System (VPS) 630, having connectivity with and/or control of one or more vehicle sensory system(s) 632. The vehicle sensory system 632 may include one or more vehicle sensors including, but not limited to, a Radio Detection and Ranging (RADAR or "radar") sensor configured for detection and localization of objects inside and outside the vehicle 100 using radio waves, sitting area buckle sensors, sitting area sensors, a Light Detecting and Ranging ("LIDAR") sensor, door sensors, proximity sensors, temperature sensors, wheel sensors, one or more ambient weather or temperature sensors, vehicle interior and exterior cameras, steering wheel sensors, microphones, etc. In some instances, the sensory system 632 may include smell sensors or electronic nose (e-nose) sensors. These smell sensors may include Metal-oxide Semiconductor (MOS) sensors, conducting polymer (CP) sensors, quartz crystal microbalance (QCM) sensors, surface acoustic wave (SAW) sensors, electrochemical gas sensors, optical gas sensors, or the like. The sensors that are part of the vehicle sensory system 632 may be coupled to the vehicle 100 at one or more locations and in one or more configurations. For example, the various sensors of the vehicle sensory system 632 may be integrated into the various subsystems of the vehicle 100, such as doors, mirrors, roof, etc. or attached to the vehicle 100 using an appropriate mounting mechanism. In some embodiments, the various sensors of the vehicle sensory system 632 may be located at the front, back, sides, top, bottom, and underneath the vehicle 100. The location of a sensor may depend on its function. For example, a sensor that monitors the area underneath the vehicle may be connected to a bottom surface of the vehicle 100; while a sensor that can monitor an area to any side of the vehicle 100 may be mounted or integrated into the doors of the vehicle 100. Vehicle sensory system 632 may also include one or more road noise sensors, such as accelerometers that are coupled to various mechanical components and/or systems of the vehicle 100. One skilled in the art will realize that the sensors may be coupled with the vehicle in various ways and locations other than the ones mentioned above.

In some embodiments, the VCU 610 may control vehicle operational aspects and implement one or more instruction sets received from the server 104, the user device 112, or from one or more instruction sets stored in the memory 604.

The TCU 626 may be configured and/or programmed to provide vehicle connectivity to wireless computing systems onboard and offboard the vehicle 100 and may include a Navigation (NAV) receiver 634 for receiving and processing a GPS signal, a BLE® Module (BLEM) 636, a Wi-Fi transceiver, a UWB transceiver, and/or other wireless transceivers (not shown in FIG. 6) that may be configurable for wireless communication (including cellular communication) between the vehicle 100 and other systems (e.g., a vehicle key fob (not shown in FIG. 6), an external server, a user device, etc.), computers, and modules. The TCU 626 may be in communication with the ECUs 614 by way of a wired or wireless bus. In some aspects, the TCU 626 may be configured to determine a real-time vehicle geolocation, e.g., via the NAV receiver 634.

The ECUs 614 may control aspects of vehicle operation and communication using inputs from human drivers, inputs from the automotive computer 608, and/or via wireless signal inputs received via the wireless connection(s) from other connected devices, such as the server 606, among others. In an embodiment, one of the ECUs 614 may include software that logs data that is exchanged over a controller area network (CAN) bus of the vehicle 100. The vehicle can use this software to wirelessly send CAN bus data to an external computer, such as the local computer system 114 described above.

The BCM 620 generally includes integration of sensors, vehicle performance indicators, and variable reactors associated with vehicle systems and may include processor-based power distribution circuitry that may control functions associated with the vehicle body such as lights, windows, security, camera(s), audio system(s), wipers, door locks and access control, various comfort controls, etc. The BCM 620 also may operate as a gateway for bus and network interfaces to interact with remote ECUs (not shown in FIG. 6).

The DAT controller 628 and/or the autonomous driving system 640 may provide Level 1 through Level-5 automated driving and driver assistance functionality that may include, for example, active parking assistance, vehicle backup assistance, and/or adaptive cruise control, among other features. The DAT controller 628 also may provide aspects of user and environmental inputs that are usable for user authentication.

In some embodiments, the automotive computer 608 may connect with an infotainment system 638 (or a vehicle Human-Machine Interface (HMI)). The infotainment system 638 may include a touchscreen interface portion and voice recognition features, biometric identification capabilities that may identify users based on facial recognition, voice recognition, fingerprint identification, or other biological identification means. In other aspects, the infotainment system 638 may be further configured to receive user instructions via the touchscreen interface portion and/or output or display notifications, navigation maps, etc. on the touchscreen interface portion. In some embodiments, the user device 112 may provide the HMI interface.

The computing system architecture of the automotive computer 608 and/or the VCU 610 may omit certain computing modules. It should be readily understood that the computing environment depicted in FIG. 6 is an example of a possible implementation according to the present disclosure, and thus, it should not be considered as limiting or exclusive.

In addition to the components noted above, the vehicle 100 may have numerous mechanical systems and subsystems. A chassis, frame, or unibody may form the backbone of the vehicle 100 and support the body and other components of the vehicle 100. The vehicle 100 may include an engine that converts fuel into mechanical power, propelling the vehicle forward. The engine includes various components such as the engine block, pistons, valves, and spark plugs. The vehicle 100 also may include a transmission system. The transmission system transfers the engine's power to the wheels. It includes the clutch, gearbox, driveshaft, and differentials, among other components. The transmission adjusts the power output to suit the vehicle's speed and load. The vehicle 100 also may include a suspension system. The suspension system absorbs shocks and maintains contact between the tires and the road, providing a smooth ride. It includes components such as springs, shock absorbers, and linkages. The vehicle 100 also includes a vehicle-stopping system that allows the driver to slow down or stop the vehicle 100. It includes components like pedals, master cylinders, lines, and pads or shoes. The vehicle 100 also includes a steering system that enables the driver to guide the car. The steering system includes components such as the steering wheel, steering column, rack and pinion, and tie rods. The vehicle 100 may further include an exhaust system that removes and filters the waste gases produced by the engine. It includes the exhaust manifold, catalytic converter, muffler, and tailpipe, among other components. The vehicle 100 also includes a cooling system that prevents the engine and/or battery from overheating. It includes components such as the radiator, water pump, thermostat, and coolant. The vehicle 100 may also include a cooling system that stores and supplies fuel to the engine. It includes the fuel tank, fuel pump, fuel filter, and fuel injectors. An electrical system of the vehicle 100 powers the car's electrical components. It may include the battery, alternator, starter motor, and wiring. The Heating, Ventilation, and Air Conditioning (HVAC) system controls the temperature inside the vehicle 100. It includes a heater core, blower motor, and air conditioning compressor. In some embodiments, the vehicle may be an electric vehicle (EV) or hybrid vehicle, and in either case, some of the aforementioned components would be replaced by an electric motor and a high-voltage battery. All the mechanical components working together ensure that the vehicle 100 operates optimally.

It is to be noted that the vehicle implements and/or performs operations, as described here in the present disclosure, in accordance with the owner's manual and safety guidelines. In addition, any action taken by the vehicle owner/driver based on recommendations or notifications provided by the vehicle should comply with all the rules specific to the location and operation of the vehicle (e.g., federal, state, country, city, etc.). The recommendations or notifications, as provided by the vehicle, should be treated as suggestions and only followed according to any rules specific to the location and operation of the vehicle. In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more hardware, software, firmware, digital components, or analog components. For example, one or more application-specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name but not in function.

It should also be understood that the word "example," as used herein, is intended to be non-exclusionary and non-limiting in nature. More particularly, the word "example," as used herein, indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices, such as those listed above, and stored on a computer-readable medium.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed to limit the claims.

Accordingly, it is to be understood that the above description is intended to be illustrative and not restrictive. Many embodiments and applications other than the examples provided would be apparent upon reading the above description. The scope should be determined not with reference to the above description but should instead be determined with reference to the appended claims, along with the full scope of equivalents to which such claims are entitled. It is anticipated and intended that future developments will occur in the technologies discussed herein and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A sensor bar comprising:

a first member having a first side and an opposing second side;

a first end cap slidably coupled to the first side;

a second end cap slidably coupled to the second side;

a plurality of sensors disposed underneath at least one of the first end cap and the second end cap; and one or more connection points usable to attach the sensor bar to a vehicle chassis, wherein the first member comprises a first surface and an opposing second surface, a first pair of channels disposed on the first surface, and a second pair of channels disposed on the first surface;

a third pair of channels disposed on the second surface;

a fourth pair of channels disposed on the second surface;

a first pair of rails disposed on a first interior surface of the first end cap;

a second pair of rails disposed on a second interior surface of the first end cap; and wherein the first pair of rails is configured to engage with the first pair of channels and the second pair of rails is configured to engage with the third pair of channels to allow the first end cap to slide in a transverse direction with respect of the first member.

2. The sensor bar of claim 1, wherein the plurality of sensors include one or more of:

proximity sensors;

ultrasonic sensors;

image sensors;

LIDAR sensors; or radar sensors.

3. The sensor bar of claim 1, further comprising a camera housing attached to the first member and a camera disposed within the camera housing.

4. The sensor bar of claim 1, wherein a first channel of the first pair of channels is parallel to a second channel of the first pair of channels.

5. The sensor bar of claim 1, wherein a first channel of the first pair of channels is disposed in-line with a second channel of the second pair of channels.

6. The sensor bar of claim 1, wherein the first member defines a chamber, and the sensor bar further comprising:

a sensor holding mechanism disposed at least partially within the chamber; and a subset of the plurality of sensors attached to the sensor holding mechanism, wherein at least a portion of the sensor holding mechanism is configured to translate in a transverse direction along with the first end cap or the second end cap.

7. A sensor bar comprising:

a first rigid member;

a first end cap movably connected to a first end of the first rigid member;

a second end cap movably connected to a second end of the first rigid member;

one or more sensors coupled to the first end cap and the second end cap;

at least one sensor attached to an external surface of the first rigid member; and one or more connection points disposed on the first rigid member and usable to connect the sensor bar to a vehicle chassis, wherein the first rigid member comprises a first pair of channels disposed on a first surface and a second pair of channels disposed on the first surface, wherein a first channel of the first pair of channels is disposed parallel to a second channel of the first pair of channels, wherein a third channel of the second pair of channels is disposed parallel to a fourth channel of the second pair of channels, wherein the first rigid member comprises a third pair of channels disposed on a second surface, wherein the second surface is opposite to the first surface, wherein the first end cap includes a first pair of rails and a second pair of rails, wherein the first pair of rails is configured to physically engage with the first pair of channels, and wherein the second pair of rails is configured to physically engage with the third pair of channels.

8. The sensor bar of claim 7, wherein the first channel is disposed in-line with the third channel and the second channel is disposed in-line with the fourth channel.

9. The sensor bar of claim 7, wherein the first channel is disposed in a transverse direction with respect to the first rigid member and the second end cap is movable in the transverse direction with respect to the first rigid member.

10. The sensor bar of claim 7, wherein the first rigid member defines an internal chamber, the sensor bar further comprising:

a sensor holding mechanism at least partially disposed within the internal chamber, wherein a subset of the one or more sensors is attached to the sensor holding mechanism, and wherein at least a portion of the sensor holding mechanism is configured to translate synchronously with the first end cap or the second end cap.

11. The sensor bar of claim 7, wherein the one or more sensors include one or more of:

proximity sensors;

ultrasonic sensors;

image sensors;

LIDAR sensors; or radar sensors.

12. A sensor bar comprising:

a first member defining an internal chamber;

a first end cap slidably coupled to a first end of the first member;

a second end cap slidably coupled to a second end of the first member;

a sensor holding mechanism at least partially disposed in the internal chamber; and one or more sensors attached to the sensor holding mechanism, wherein at least a portion of the sensor holding mechanism is movable in a transverse direction with respect to the first member, wherein the first member includes two pairs of channels disposed on a first surface and two pairs of channels disposed on a second surface opposing the first surface, wherein the first end cap comprises two pairs of rails and the second end cap comprises two pairs of rails, wherein a first pair of channels is disposed on the first surface and a second pair of channels is disposed on the second surface, the first pair of channels and the second pair of channels configured to respectively engage with the two pairs of rails of the first end cap, and wherein a third pair of channels is disposed on the first surface and a fourth pair of channels is disposed on the second surface, the third pair of channels and the fourth pair of channels configured to respectively engage with the two pairs of rails of the second end cap.

13. The sensor bar of claim 12, wherein:

the first end cap comprises a first window configured to expose at least one sensor of the one or more sensors to an external environment.

\* \* \* \* \*